FADER AMPLIFIER UTILIZING MECHANICAL GAIN CONTROL MEANS

Filed Jan. 21, 1964 2 Sheets-Sheet 1

July 12, 1966 A. R. KAYE 3,260,951

FADER AMPLIFIER UTILIZING MECHANICAL GAIN CONTROL MEANS

Filed Jan. 21, 1964 2 Sheets-Sheet 2

United States Patent Office 3,260,951
Patented July 12, 1966

3,260,951

FADER AMPLIFIER UTILIZING MECHANICAL GAIN CONTROL MEANS

Alan R. Kaye, Ottawa, Ontario, Canada, assignor to Northern Electric Company Limited, Montreal, Quebec, Canada Filed Jan. 21, 1964, Ser. No. 339,215
3 Claims. (Cl. 330—29)

This invention relates to variable gain transistor circuits, and more particularly to circuits especially suited for use in a fader amplifier, for example a television fader amplifier.

A fader amplifier is employed in a transmission system for the fading and/or cross mixing (superimposition, with or without changes of signal strength) of one or more signals, usually television signals.

Such devices are commonly referred to as fader amplifiers because their prime utility is in the fading in or fading out of a single video signal, or the simultaneous fading in of one signal and fading out of another (dissolving). Although such circuits can also be used for direct superimposition of video signals without fading, they will be referred to in this application as "fader amplifiers." Moreover, the term "amplifier" is used in the sense of a circuit for modifying the amplitude of a signal, not necessarily to increase it.

Conventionally, television fader amplifiers are provided with a pair of control members, usually manually operable levers, one such member controlling the strength of a first video signal and the other member controlling the strength of a second video signal. By moving the control members simultaneously, the strength of one signal can be reduced while that of the other is increased so as theoretically to maintain a constant total signal strength while merging from one video signal to the other. This process is known as a complementary mix and may be expressed as $$C=PA+qB \qquad (1)$$

where A and B are the input video signals and are assumed to have the standard nominal television level. C is the combined output signal, and $$p+q=1 \qquad (2)$$

where $p$ and $q$ both lie somewhere in the range from zero to unity.

The same apparatus can be used for fading in or fading out a single signal, for superimposing a pair of signals each at full strength, or for fading in or fading out a pair of superimposed signals. In these latter instances the total signal strength does not remain constant and the condition known as a non-complementary mix exists. The sum $p+q$ can now lie anywhere between zero and 2.

A fader amplifier can also be used in any other circumstance where remote control of the mixing and/or fading of wide-band signals is required, one such application being that of radio broadcasting.

Circuits useful in such a fader amplifier are disclosed in United States patent application Serial No. 339,216 filed concurrently herewith of Alan R. Kaye and Cecil L. Murray. One of the circuits there disclosed can achieve a complementary mix. By using two such circuits as successive stages a non-complementary mix can also be achieved.

One object of the present invention is to provide generally similar circuits which have basically the same characteristics and advantages, but in which a non-complementary mix as well as a complementary mix can be achieved in a single circuit, without the need for two stages. Another object is to provide a generally useful remote control variable gain circuit in which the output is varied in accordance with two independent control voltages.

To this end the invention in its broadest scope consists of a variable gain circuit comprising (a) A direct voltage source.

(b) First, second, third and fourth transistors all of like conductivity type, (c) Means connecting the collector-emitter elements of said first and second transistors in parallel to form a first parallel circuit, (d) Means connecting the collector-emitter elements of said third and fourth transistors in parallel to form a second parallel circuit, (e) A first signal source for generating an alternating current signal B, and a second signal source of generating an alternating current signal A, each of said signal sources being of high impedance relative to the impedances of said parallel circuits, (f) Means connecting said direct voltage source, said first signal source and said first parallel circuit in series, (g) Means connecting said direct voltage source, said second signal source and said second parallel circuit in series, (h) Means connecting the base of said first transistor to a reference voltage at direct current and signal frequencies, (i) Capacitance means connecting the bases of said second, third and fourth transistors to said reference voltage at signal frequencies, (j) Means connected to the bases of said second and third transistors for applying a first bias voltage to the bases of said second and third transistors, (k) Means independent of said means (h) connected to the base of said fourth transistor for applying a second bias voltage to the base of said fourth transistor, to permit the bias on the base of said fourth transistor to be varied independently of the voltage on the base of said first transistor, (l) Said first and third transistors defining a first transistor pair, and said second and fourth transistors defining a second transistor pair, (m) And means coupled to the collectors of the transistors of one of said first and second transistor pairs for deriving an output signal C therefrom, said output signal being of the form $C+hA+kB$, where $k$ is a factor variable between zero and unity by operation of said means (j) alone, and $h$ is a factor variable between zero and unity by operation of both said means (j) and (k).

Further understanding of the various aspects of the present invention will be facilitated by reference to the accompanying drawings, the specific circuits illustrated being provided by way of example only, and the scope of the invention being defined by the appended claims.

Figure 1:
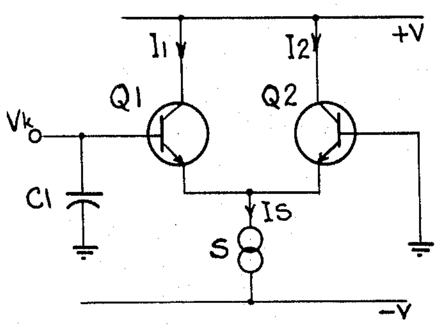
FIGURE 1 is a circuit provided by way of preliminary explanation.

In FIGURE 1, two transistors Q1 and Q2 of like polarity are shown with their collector-emitter electrodes connected as a parallel circuit between direct supply voltages +V and −V. The base of transistor Q2 is directly coupled to ground, while the base of transistor Q1 is grounded at signal frequencies through a capacitor C1, or any other suitable means such as a low output impedance D.C. amplifier. The base of transistor Q1 is biased by a control voltage V$k$ which could be supplied by the same D.C. amplifier. A signal generator shown diagrammatically at S is connected in series with this parallel circuit and is assumed to have an internal impedance very much higher than the low input impedance of the two transistors in parallel. The generator S is essentially a current generator rather than a voltage generator. By varying the control voltage V$k$ through a small range above and below ground potential (about ±0.2 volt) the ratio of the input impedances of the transistors Q1 and Q2 can be varied throughout the range from approximately 0 to a very large value tending towards infinity.

The current I$s$ will then divide itself between the two transistors as currents I1 and I2 in the ratio of such impedances. This can be expressed as $$I1=(1-k)Is \qquad (3)$$

and $$I2=k1s \qquad (4)$$

where $k$ may vary from zero to unity and is given by the expression $$k=\frac{1}{1+e^{Vk/Vt}} \qquad (5)$$

Equation 5 assumes that the collector voltage of the transistors has no effect on the current division, that the base currents of the transistors are negligible by comparison with the collector current, and that the impedance of any load in either collector circuit is low in comparison with the output impedance of the transistors. Equation 5 is dependent on the base of each transistor being connected to a reference voltage at all signal frequencies (which may include zero frequency). That is, each transistor is operating in the grounded base mode.

Figure 2:
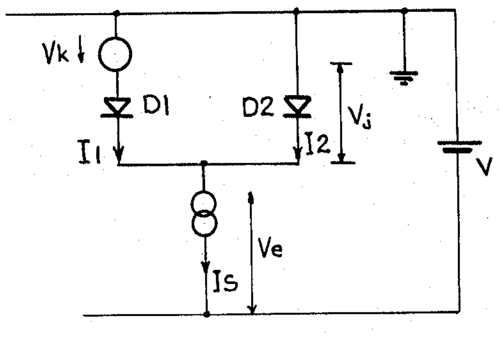
FIGURE 2 is a partial equivalent circuit for FIGURE 1.

This is illustrated by the partial equivalent circuit of FIGURE 2 which denotes the base-emitter junctions of transistors Q1, Q2 by diodes D1, D2.

The derivation of Equation 5 is as follows:

For any semiconductor junction $$I=Ir(e^{Vb/Vt}-1) \qquad (6)$$

where $I$=the current through the junction
$Ir$=the reverse saturation current
$Vb$=the forward bias across the junction
$Vt$=a constant for a given transistor at a given temperature At all usable current levels Equation 6 can be approximated to $$I=Ire^{Vb/Vt}$$

which when applied to the circuit of FIGURE 2 gives $$I1=Ire^{(Vj+Vk)/Vt}$$

and $$I2=Ire^{Vj/Vt}$$

where $$Vj=V-Ve$$

and $Ve$=the voltage across the source S.

Since $$Is=I1+I2$$

then $$Is=Ire^{Vj/Vt}(1+e^{Vk/Vt})$$

From Equation 4

$$k=\frac{I2}{Is}$$

$$=\frac{e^{Vj/Vt}}{e^{Vj/Vt}(1+e^{Vk/Vt})}$$

$$=\frac{1}{1+e^{Vk/Vt}}$$

which establishes Equation 5. It will be noted that the gain $k$ is independent of signal level and consequently there is no distortion. The foregoing calculations are only true provided I$s$ is generated from a high impedance source S.

It has been found experimentally that the circuit obeys this law very closely. The source of the control voltage V$k$ may be remote, so that the circuit forms a remote gain control. Either I1 or I2 may be regarded as the signal output and a load connected in series with the collector of either transistor Q1 or transistor Q2. Provided the load impedance is low compared with the output impedance of the transistors it will not affect the value of $k$.

Figure 3:
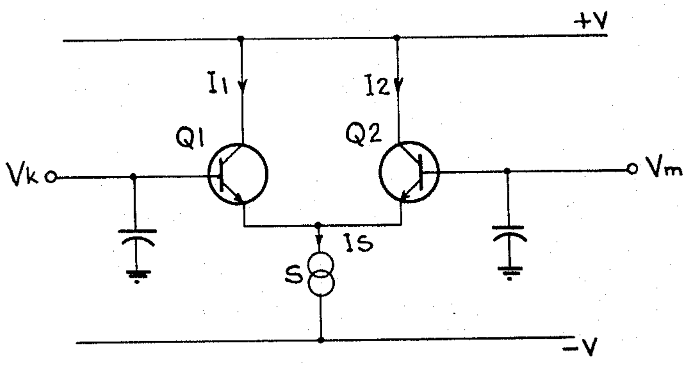
FIGURE 3 is a circuit of a first embodiment of the invention.

If now the base of transistor Q2 is biased in a similar manner to that of the transistor Q1 but by a second control voltage V$m$, as shown in FIGURE 3, Equations 3 and 4 hold, but $k$ is now given by the expression $$k'=\frac{1}{1+e^{(Vk-Vm)/Vt}} \qquad (7)$$

Figure 4:
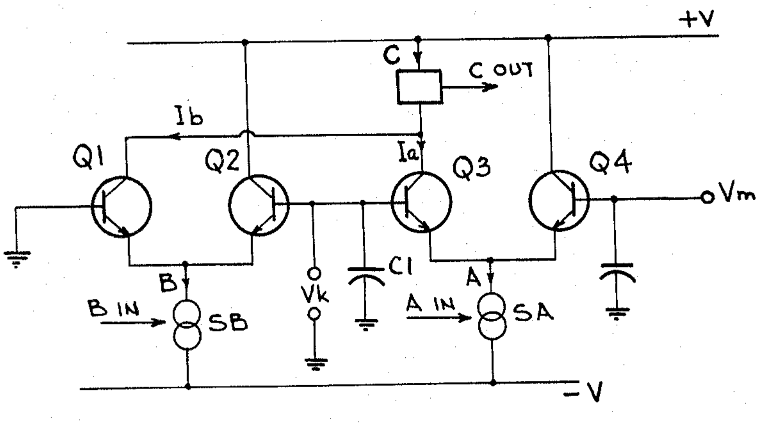
FIGURE 4 is a circuit of a second embodiment of the invention.
Figure 5:
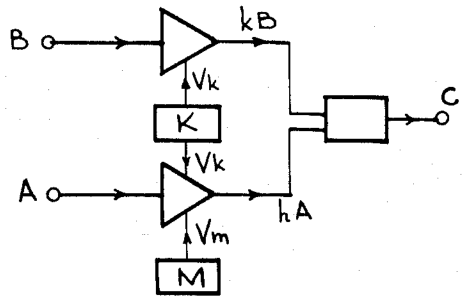
FIGURE 5 is a block diagram related to the circuit of FIGURE 4.

Now to achieve non-complementary as well as complementary mixing, the circuit of FIGURE 4 may be employed. This circuit employs two pairs of parallel-connected, grounded-base transistors Q1 to Q4, with the control voltage V$k$ applied to the bases of transistors Q2 and Q3. There are now two signal generators SA and SB representing conventional input circuits for signals A and B. The outputs of transistors Q1 and Q3 are added as an output current C. The base of transistor Q4 is biased by the second control voltage V$m$, which will be supplied from a potentiameter M (FIGURE 5).

In FIGURE 4, $$Ib=kB$$

and $$Ia=hA$$

where $$h=1-k'$$

If control voltage V$m$ is held at 0 while control voltage V$k$ is varied, a complementary mix takes place, since $k=k'$ and $h=1-k$. If both the control voltages V$k$ and V$m$ are varied, a non-complementary mix is obtained.

The equation for the output is now $$C=hA+kB \qquad (8)$$

While $h$ is a function of both V$k$ and V$m$, $k$ remains solely a function of V$k$, Equation 5. The circuit of FIGURE 4 is represented symbolically in FIGURE 5, in which the function V$k$ is provided by a potentiometer K.

Figure 6:
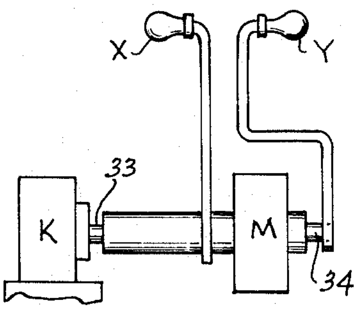
FIGURE 6 shows a mechanical arrangement of control levers.

A mechanical arrangement of control levers suited to the circuit of FIGURES 4 and 5 is shown in FIGURE 6. The lever X solely controls the shaft 33 of the potentiometer K, the frame of which is fixed. The frame of potentiometer M is connected to rotate with the lever X while its shaft 34 is rotated by the control lever Y. Thus the setting of the potentiometer K is at all times dependent only on the position of the lever X, while the position of the potentiometer M is dependent solely on the separation of the two levers. Thus the levers are moved in unison to keep V$m$ constant and to vary V$k$ for a complementary mix, and lever Y is moved relatively to lever X to vary V$m$ for non-complementary mixing.

Figure 7:
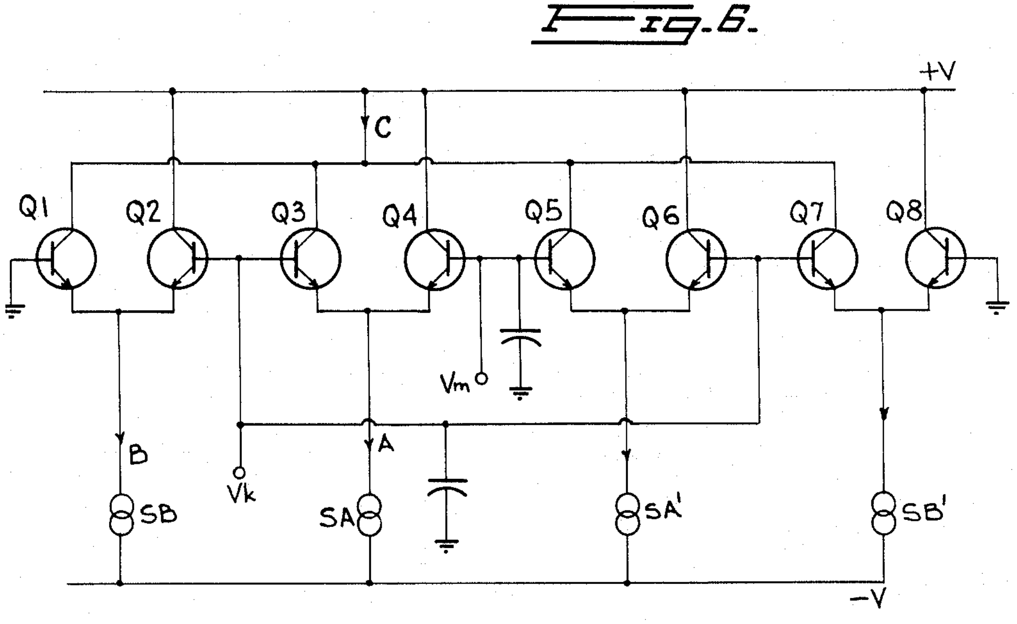
FIGURE 7 shows a further embodiment of the invention.

When the circuit of FIGURE 4 is employed for a non-complementary mix, i.e. with a voltage other than 0 applied as the control voltage V$m$, changes in D.C. level occur. This can be avoided by adding the features of the circuit of FIGURE 7, in which there are two extra variable gain stages. These extra stages represented by transistors Q5 to Q8 are driven by direct current signal generators SA′ and SB′ generating signals equal to the D.C. components of the signal generators SA and SB respectively. The D.C. stages comprised by transistors Q5 to Q8 are identical with the signal handling stages comprised by transistors Q1 and Q4 and are controlled by the same control voltages V$k$ and V$m$. Opposite polarity outputs are added together, the collector-emitter currents of transistors Q5 and Q7 being added to the collector-emitter currents of transistors Q1 and Q3, whereas they correspond as far as their connections to the bias voltages are concerned to transistors Q2 and Q4. With this arrangement no change in the D.C. component of the output C occurs for any alteration of the two control voltages.

It should be made clear that in any of these circuits, the other collector or pair of collectors can generate the output current C. Similarly, the input signals A and B can be interchanged throughout.

I claim:

1. A variable gain circuit comprising
(a) a direct voltage source,
(b) first, second, third and fourth transistors all of like conductivity type,
(c) means connecting the collector-emitter elements of said first and second transistors in parallel to form a first parallel circuit,
(d) means connecting the collector-emitter elements of said third and fourth transistors in parallel to form a second parallel circuit,
(e) a first signal source for generating an alternating current signal B, and a second signal source for generating an alternating current signal A, each of said signal sources being of high impedance relative to the impedances of said parallel circuits,
(f) means connecting said direct voltage source, said first signal source and said first parallel circuit in series,
(g) means connecting said direct voltage source, said second signal source and said second parallel circuit in series,
(h) means connecting the base of said first transistor to a reference voltage at direct current and signal frequencies,
(i) capacitance means connecting the bases of said second, third and fourth transistors to said reference voltage at signal frequencies,
(j) means connected to the bases of said second and third transistors for applying a first bias voltage to the bases of said second and third transistors,
(k) means independent of said means (h) connected to the base of said fourth transistor for applying a second bias voltage to the base of said fourth transistor, to permit the bias on the base of said fourth transistor to be varied independently of the voltage on the base of said first transistor,
(l) said first and third transistors defining a first transistor pair, and said second and fourth transistors defining a second transistor pair,
(m) and means coupled to the collectors of the transistors of one of said first and second transistor pairs for deriving an output signal C therefrom, said output signal being of the form $C=hA+kB$, where $k$ is a factor variable between zero and unity by operation of said means ($j$) alone, and $h$ is a factor variable between zero and unity by operation of both said means (j) and (k).

2. A circuit according to claim 1 wherein each of said signal sources also generates a respective direct current component, and said circuit further includes
(n) fifth, sixth, seventh and eighth transistors all of the same conductivity type as said first to fourth transistors,
(o) means connecting the collector-emitter elements of said fifth and sixth transistors in parallel to form a third parallel circuit, and means connecting the collector-emitter elements of the seventh and eighth transistors in parallel to form a fourth parallel circuit,
(p) two direct current sources for respectively generating currents equal to the direct current components of said signal sources,
(q) means connecting said direct voltage source, said third parallel circuit, and one of said direct current sources in series,
(r) means connecting said direct voltage source, said fourth parallel circuit, and the other of said direct current sources in series,
(s) means connecting the base of said eighth transistor to said reference voltage at direct current and signal frequencies,
(t) capacitance means connecting the bases of said fifth, sixth and seventh transistors to said reference voltage at signal frequencies,
(u) means connecting the bases of said sixth and seventh transistors to said means (j) for applying said first bias voltage to the bases of said sixth and seventh transistors,
(v) means connecting the base of said fifth transistor to said means (k) for applying said second bias voltage to the base of said fifth transistor to be varied independently of the voltage on the base of said eighth transistor,
(w) said fifth and seventh transistors defining a third transistor pair, and said sixth and eighth transistors defining a fourth transistor pair,
(x) and means coupling the collectors of the transistors of a selected one of said third and fourth transistor pairs to said means (m) for deriving said output signal, such selected pair being said third pair when said means (m) is coupled to the transistors of said first transistor pair and being said fourth pair when said means (m) is coupled to the transistors of said second transistor pair.

3. A circuit according to claim 1 including
(n) first control means for varying said first bias voltage, and second control means for varying said second bias voltage,
(o) a pair of control members movable through coterminous paths of travel,
(p) means connecting said first control means to one of said control members for operation in response to the position of said first control member,
(q) and means connecting said second control means to both said control members for operation in response to the relative position of said control members.

References Cited by the Examiner

UNITED STATES PATENTS

| | | | |
|---|---|---|---|
| 2,412,279 | 12/1946 | Miller | 330—130 X |
| 2,971,174 | 2/1961 | Lyon | 338—131 X |
| 3,036,158 | 5/1962 | Romano. | |
| 3,195,067 | 7/1965 | Klein et al. | 330—126 |
| 3,210,683 | 10/1965 | Pay | 330—68 X |

ROY LAKE, *Primary Examiner.*

N. KAUFMAN, F. D. PARIS, *Assistant Examiners.*